US012780127B2

(12) United States Patent
Proulx et al.

(10) Patent No.: US 12,780,127 B2
(45) Date of Patent: Nov. 3, 2026

(54) VEHICLE POWER BAR

(71) Applicant: Bombardier Recreational Products Inc., Valcourt (CA)

(72) Inventors: Yanick Proulx, Sherbrooke (CA); Jonathan Lambert, St-Liboire (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 103 days.

(21) Appl. No.: 18/666,185

(22) Filed: May 16, 2024

(65) Prior Publication Data

US 2025/0353455 A1 Nov. 20, 2025

(51) Int. Cl.
*H01M 50/249* (2021.01)
*B60R 16/033* (2006.01)
*H01M 50/244* (2021.01)

(52) U.S. Cl.
CPC ......... *B60R 16/033* (2013.01); *H01M 50/244* (2021.01); *H01M 50/249* (2021.01)

(58) Field of Classification Search
CPC .. B60R 16/033; H01M 50/249; H01M 50/244
USPC .......................................................... 307/9.1
See application file for complete search history.

(56) References Cited

U.S. PATENT DOCUMENTS

| | | | | |
|---|---|---|---|---|
| 10,604,090 | B1 * | 3/2020 | Blumenstein | H01M 50/296 |
| 2011/0153898 | A1 * | 6/2011 | Krempasky, II | B60R 16/023 701/31.4 |
| 2019/0123937 | A1 * | 4/2019 | Takamatsu | B60K 35/10 |

* cited by examiner

*Primary Examiner* — Michael R. Fin
(74) *Attorney, Agent, or Firm* — BCF LLP

(57) ABSTRACT

A powered accessory connection system for a vehicle may have a portable power bar comprising at least one port for electrically connecting an accessory to the vehicle. The portable power bar comprises a housing with at least one surface for mechanically interconnecting itself to the vehicle for securement therein or thereto. The portable power bar is powered by a power source disposed on the vehicle and a plurality of signal transmitting wires interconnect the accessory to the at least one port of the portable power bar.

15 Claims, 6 Drawing Sheets

VEHICLE POWER BAR

FIELD OF THE INVENTION

The present invention relates to improvements in providing power to accessories used with and/or on recreational vehicles, such as, for example, side-by-side vehicles, snowmobiles, ATVs, personal watercraft, and the like.

BACKGROUND

Various accessories allow users to add functionalities to their recreational vehicles, such as, for example side-by-side vehicles. As accessory technologies evolve, the number of accessories connectable to each vehicle increases, and/or the complexity of the accessory technologies increase, there is a need to provide a system configured to accommodate and manage the use of an accessory while on the vehicle.

In the prior art, a terminal block is located under the hood that includes a constant 12-volt ("12V") terminal connected to a battery, a ground terminal and a "keyed" 12V terminal configured to operate when a key of the vehicle is inserted into the keyhole and/or when the engine is on, and/or when an ignition switch achieves a particular position.

In the prior art, a power bar is located under the hood of a vehicle and comprises electrical ports to electrically connect different accessories to the battery of the vehicle. In such cases, the accessory connection is not convenient or user-friendly. Further, there is no way for the vehicle's stock installed control functionalities to control the electrically connected accessories via the power bar.

In the prior art, accessories can be interconnected via loose harnesses comprising one or more wires to the accessory control module ("ACM") of the vehicle. However, in these ACM harness systems, user friendliness, installation time, price, and modularity remain issues that hinder the use of the accessory with the particular vehicle.

SUMMARY

An exemplary powered accessory connection system for a vehicle may comprise a portable power bar with at least one port for electrically connecting an accessory to the vehicle, wherein the portable power bar comprises a housing with at least one surface for mechanically interconnecting to the vehicle for securement therein or thereto. An exemplary powered accessory connection system for a vehicle may further comprise a power source disposed on the vehicle and to which at least one power connection from the at least one port is directly or indirectly made. The exemplary powered accessory connection system for a vehicle may comprise a plurality of signal transmitting wires interconnecting the accessory to the at least one port, wherein the plurality of signal transmitting wires enable control of the accessory via the at least one port.

In addition to the previously described embodiment and/or as an alternative to any other described exemplary embodiment, an exemplary powered accessory connection system for a vehicle may further comprise an accessory control module configured to control the accessory via the plurality of signal transmitting wires.

In addition to the previously described embodiment and/or as an alternative to any other described exemplary embodiment, an exemplary powered accessory connection system for a vehicle may further comprise an accessory control module as part of the at least one power connection.

In addition to the previously described embodiment and/or as an alternative to any other described exemplary embodiment, an exemplary powered accessory connection system for a vehicle may further comprise at least one fuse as part of the at least one power connection.

In addition to the previously described embodiment and/or as an alternative to any other described exemplary embodiment, an exemplary powered accessory connection system for a vehicle may be configured such that the vehicle comprises a user input device and the portable power bar is configured to be located at a distance of less than 1 meter from the user input device.

In addition to the previously described embodiment and/or as an alternative to any other described exemplary embodiment, an exemplary powered accessory connection system for a vehicle may be configured such that the portable power bar is configured to be located in a front hood of the vehicle.

In addition to the previously described embodiment and/or as an alternative to any other described exemplary embodiment, an exemplary powered accessory connection system for a vehicle may be configured such that the portable power bar is a first power bar and the powered accessory connection system comprises a second power bar comprising at least one port and a housing with at least one surface for mechanically interconnecting to the vehicle for securement therein or thereto.

In addition to the previously described embodiment and/or as an alternative to any other described exemplary embodiment, an exemplary powered accessory connection system for a vehicle may be configured such that the second power bar is configured to be affixed to a roof of the vehicle.

In addition to the previously described embodiment and/or as an alternative to any other described exemplary embodiment, an exemplary powered accessory connection system for a vehicle may be configured such that the roof comprises a liner and a shell, and the second power bar is configured to be located between the inner liner and the outer shell.

In addition to the previously described embodiment and/or as an alternative to any other described exemplary embodiment, an exemplary powered accessory connection system for a vehicle may be configured such that the powered accessory connection system comprises a third power bar comprising at least one port and a housing with at least one surface for mechanically interconnecting to the vehicle for securement therein or thereto.

In addition to the previously described embodiment and/or as an alternative to any other described exemplary embodiment, an exemplary powered accessory connection system for a vehicle may be configured such that the third power bar is configured to be affixed to a rear firewall of the vehicle.

In addition to the previously described embodiment and/or as an alternative to any other described exemplary embodiment, an exemplary powered accessory connection system for a vehicle may be configured such that the third power bar is configured for electrically connecting accessories configured to be located on a rear portion of the vehicle.

In addition to the previously described embodiment and/or as an alternative to any other described exemplary embodiment, an exemplary powered accessory connection system for a vehicle may further comprise an accessory control module configured to control the accessory via the plurality of signal transmitting wires. According to this exemplary embodiment, the accessory control module comprises a first control port and a second control port such that the first power bar is electronically connected to the accessory control module via the first control port, the second power bar is electronically connected to the accessory control module via the second control port, and the third power bar is electronically connected to the second control port and to the accessory control module via the second power bar.

In addition to the previously described embodiment and/or as an alternative to any other described exemplary embodiment, an exemplary powered accessory connection system for a vehicle may further comprise a fuse box electrically between the power source and the first, second and third power bars. According to this exemplary embodiment, the system may be further configured such that the fuse box can prevent electrical overload on at least one of the power source and the first, second and third power bars, In further accordance with this exemplary embodiment, the fuse box may comprise a first connection port and a second connection port such that the first power bar is electronically connected to the fuse box via the first connection port, the second power bar is electronically connected to the fuse box via the second connection port, and the third power bar is electronically connected to the second connection port and to the fuse box via the second power bar.

In addition to the previously described embodiment and/or as an alternative to any other described exemplary embodiment, an exemplary powered accessory connection system for a vehicle may further comprise a first fuse box electrically between the power source and the first power bar, and a second fuse box electrically between the power source and the second and third power bars. In such an embodiment, the exemplary powered accessory connection system may be configured such that the first fuse box can prevent electrical overload on at least one of the power source and the first power bar, the second fuse box can prevent electrical overload on at least one of the power source and the second and third power bars. Accordingly, the first fuse box may have a connection port to electrically connect with the first power bar, the second power bar may have a connection port to electrically connect with the second fuse box, and the third power bar may be electronically connected to the to the second fuse box via the second power bar.

In addition to the previously described embodiment and/or as an alternative to any other described exemplary embodiment, an exemplary powered accessory connection system for a vehicle may further comprise at least one fuse as part of the at least one power connection.

In addition to the previously described embodiment and/or as an alternative to any other described exemplary embodiment, an exemplary powered accessory connection system for a vehicle may be configured such that the power source is directly connected to one of a fuse box and the at least one port.

In another exemplary embodiment, a powered accessory connection and control kit may comprise a portable power bar comprising at least one port for electrically connecting an accessory to a vehicle, wherein the portable power bar comprises a housing with at least one surface for mechanically interconnecting to the vehicle for securement therein or thereto. Such an exemplary powered accessory connection and control kit may further comprise a fuse box for interconnecting to a power connection between the portable power bar and a battery of the vehicle. In a further aspect, the exemplary powered accessory connection and control kit may also comprise a control connection to enable communication of control signals via the portable power to an accessory configured to couple to the portable power bar.

In addition to the previously described embodiment and/or as an alternative to any other described exemplary embodiment, an exemplary powered accessory connection and control kit may further comprise at least five ports for electrically connecting one or more accessories to the vehicle.

In addition to the previously described embodiment and/or as an alternative to any other described exemplary embodiment, an exemplary powered accessory connection and control kit may further comprise a plurality of pins for communicating control signals via the portable power bar.

In addition to the previously described embodiment and/or as an alternative to any other described exemplary embodiment, an exemplary powered accessory connection and control kit may be configured such that each port on the portable power bar comprises two or more control signal pins.

In addition to the previously described embodiment and/or as an alternative to any other described exemplary embodiment, an exemplary powered accessory connection and control kit may be configured such that the control connection enables control of the accessory via an accessory control module on the vehicle.

In addition to the previously described embodiment and/or as an alternative to any other described exemplary embodiment, an exemplary powered accessory connection and control kit may be configured such that the control bar enables its selection and use via an accessory control module on the vehicle.

In yet another alternative embodiment, there is a method for installing a power bar on a vehicle that may comprise the following steps, though not necessarily in the following order: mechanically fastening a housing of a power bar to a corresponding fastening location on a vehicle, electrically connecting the power bar to a power source on the vehicle, electrically connecting the power bar to an accessory control module, and controlling an accessory configured to engage a port on the power bar using at least one signal pin disposed within the port of the power bar.

In addition to the previously described embodiment and/or as an alternative to any other described exemplary embodiment, an exemplary method may be configured such that the step of controlling is performed in part by the accessory control module.

In addition to the previously described embodiment and/or as an alternative to any other described exemplary embodiment, an exemplary powered accessory connection system for a vehicle may be configured such that the step of electrically connecting the power bar to the power source includes interconnecting the power bar to a fuse box.

In addition to the previously described embodiment and/or as an alternative to any other described exemplary embodiment, an exemplary powered accessory connection system for a vehicle may be configured such that the step of electrically connecting the power bar to the power source further includes interconnecting the power bar to the accessory control module.

Figure 1:
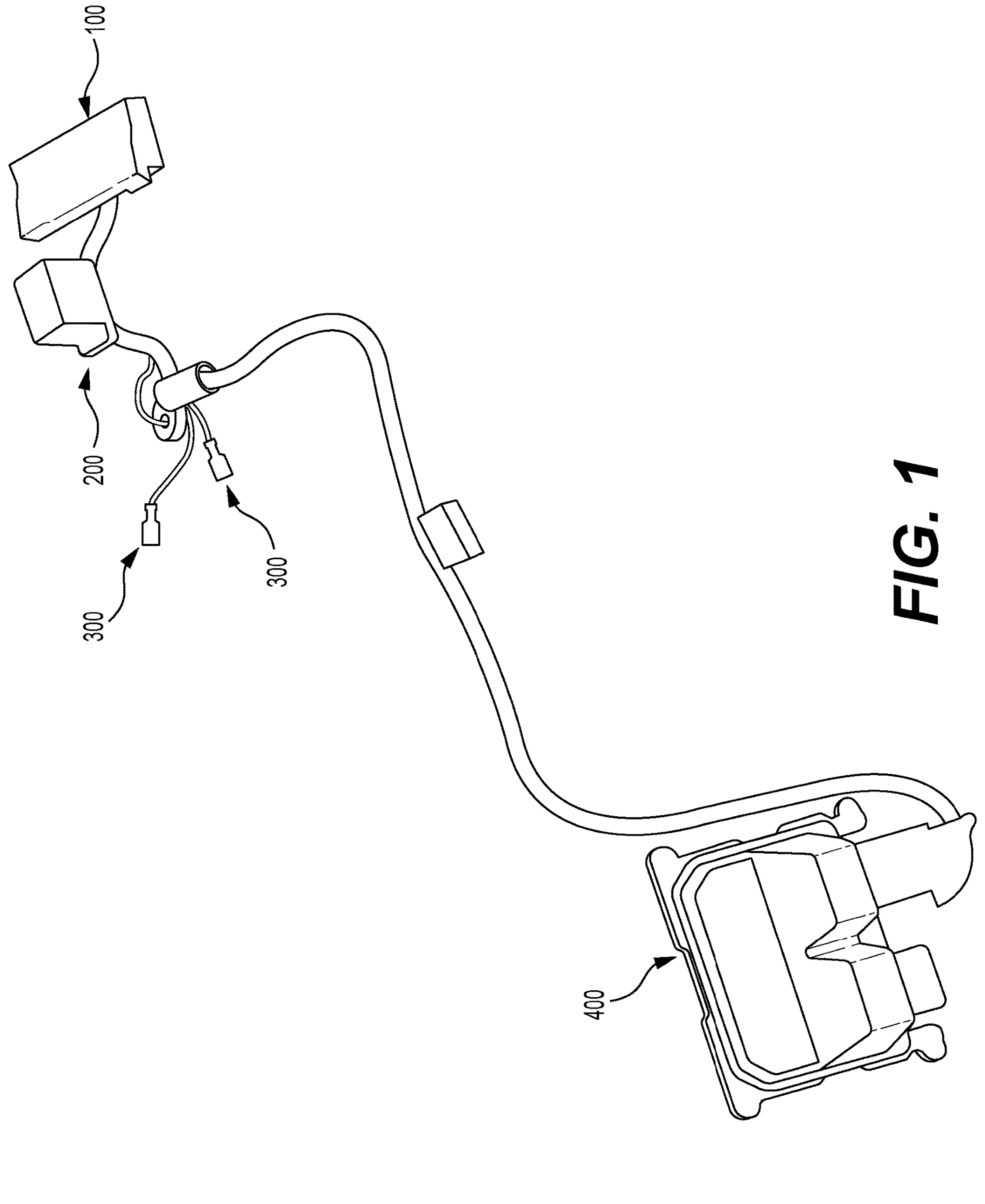
FIG. 1 illustrates an exemplary vehicle power bar system for powering accessories.

In the drawings like characters of reference indicate corresponding parts in the different and interchangeable and interrelated figures. Parts and components of each figure may be substitutes for other components in other figures to achieve the various methods and embodiments disclosed herein. Methods and protocols disclosed in any embodiment may be run in any order so as to affect their disclosed goals and/or enable performance of the systems as described. Additionally, any one embodiment may utilize any method or protocol described and in any portions, sequences, and combinations thereof.

DETAILED DESCRIPTION

While the disclosures herein contemplate use of exemplary power bars to be described in any vehicle and/or recreational vehicle, including recreational vehicles of the type previously indicated and/or known to those skilled in the art, the use of an exemplary power bar in a side-by-side ("SSV") vehicle is for illustration only and not limiting to the intended uses for which such disclosures can be put.

As provided for in FIG. 1, an exemplary power bar 100 may be interconnected to a vehicular ACM 400 via one or more cables, which may also include connections to a fuse box 200 and vehicle battery connections 300. In this exemplary embodiment, the fuse box 200 comprises at least one fuse electrically connected to a connection port 10 of the power bar 100. More specifically the fuse box 200 comprises a plurality of fuses each electrically connected to a distinct connection port 10 of the power bar 100. The fuse box 200 may also comprise one or more relays each electronically connected to the ACM 400 and to a pre-determined connection port 10 of the power bar 100 for simple control of certain accessories (e.g., turning lights on/off). In an exemplary aspect, the power bar 100 may have its own fuse box 200 to aid the power bar 100 in avoiding electrical overloads. While one fuse box 200 may be shown for an entire power bar 100, a fuse box 200 may be utilized for each connection port 10 (to be illustrated in FIGS. 2-3) to avoid electrical overloads for a particular connection port 10 and accessory (not shown). In the illustrative embodiment, the power bar 100 may also have a separate dedicated battery power connection 300 to the vehicle battery. Alternatively, the power bar 100 may feed off battery connections of other components in the vehicle. Additionally, each of the portions of the cables interconnecting the power bar 100 to the fuse box 200, battery connections 300, and/or the ACM 400 may also be affixed to the vehicle using various attachments and/or fixation mechanisms.

Figure 5:
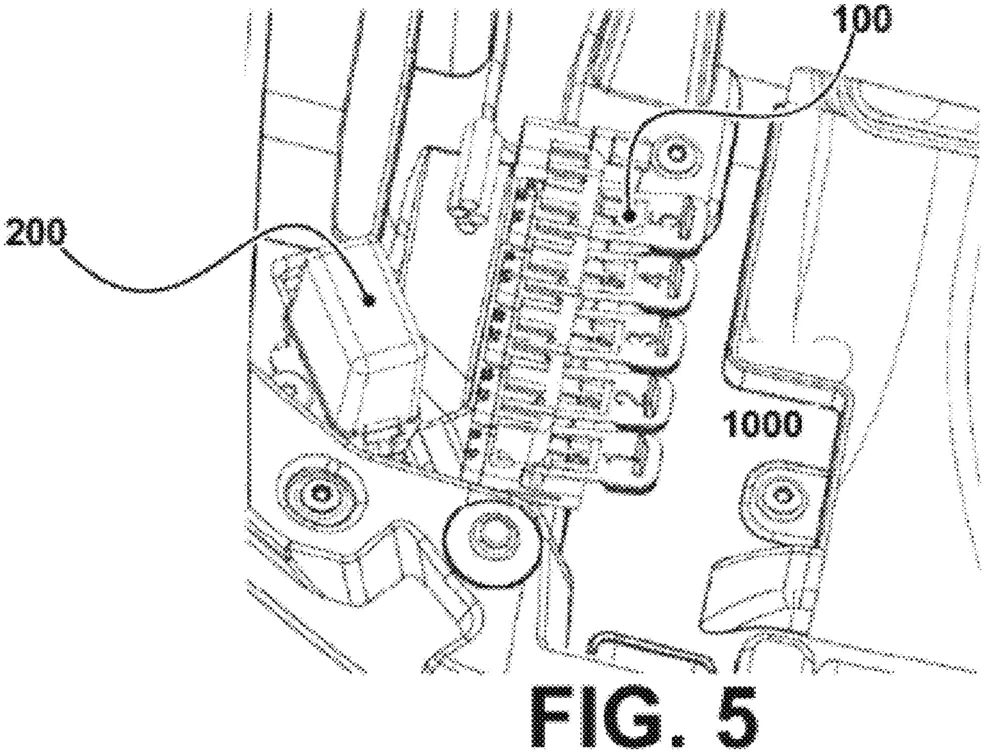
FIG. 5 illustrates an exemplary power bar installed in an exemplary vehicle section to enable the powering of accessories while therein.

An exemplary power bar 100 may be located in different places in the vehicle, including in a hood of the vehicle (in a service center area), in a front hood of the vehicle, in a roof (located between the inner liner and the outer shell.r of the roof), in or on a rear wall (e.g., a firewall of the vehicle), etc. The vehicle may comprise a plurality of power bars 100 disposed at these different locations, and each location may accommodate more than one power bar 100 for modularity purposes. As such, there may be different configurations to connect various accessories, such as, for example, a power bar 100 in the front only, power bars 100 in the vehicle front and on the vehicle roof, power bars 100 in the vehicle front, rear, and roof, etc. While each of the locations for power bar 100 placement may be static when the vehicle is not in motion, those skilled in the art may consider power bar 100 placement on those parts of the vehicle that are movable in normal operation, e.g., seats, handles, mirrors. In an exemplary embodiment as illustratively provided for in FIGS. 5-6, an exemplary vehicle front area may have clips 34 and a connection junction 64 adjacent fuse box 200. An exemplary power bar 100 may be mechanically affixed to the vehicle section 1000 via the clips 34 interacting with the mechanical fasteners on housing 30. In a preferred embodiment, the power bar 100 may be located no more than approximately one (1) meter from the user-input device.

Figure 6:
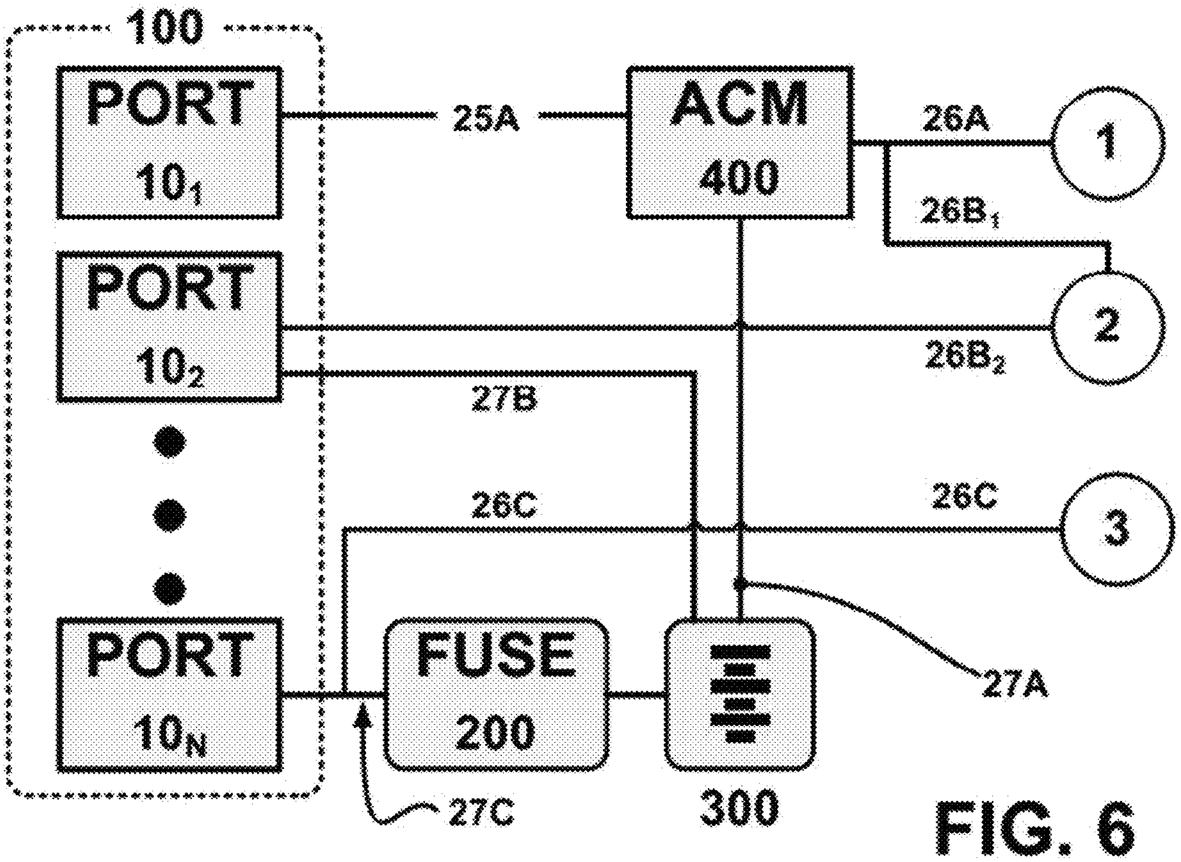
FIG. 6 illustrates an exemplary operational schematic for an exemplary smart accessory ecosystem involving a vehicular power bar and the accessories it powers and can be used to control the same via an exemplary accessory control module.

An exemplary ACM 400 may be a computer comprising I/O ports, at least one processing unit, at least one memory unit, and a user interface. An exemplary ACM 400 may be powered by the battery 300 (as shown in FIG. 6) and may be connected to each accessory via an exemplary power bar 100. In an exemplary embodiment, the user interface of an exemplary ACM 400 may include a keypad and a touch screen and/or a keypad and/or touch screen mounted to and/or on/within the dashboard of the vehicle. In other embodiments, the user interface may include other components (microphone, speaker, etc.) In a preferred embodiment, an exemplary ACM 400 comprises a graphical user interface (GUI) at least partly implemented by the screen. In an alternative embodiment, the ACM 400 may also be connectable to a remote device such as a smart phone and may be controllable via a user interface on the smartphone—in other words, the GUI of the ACM may also be partly implemented on the remote device.

Figure 2:
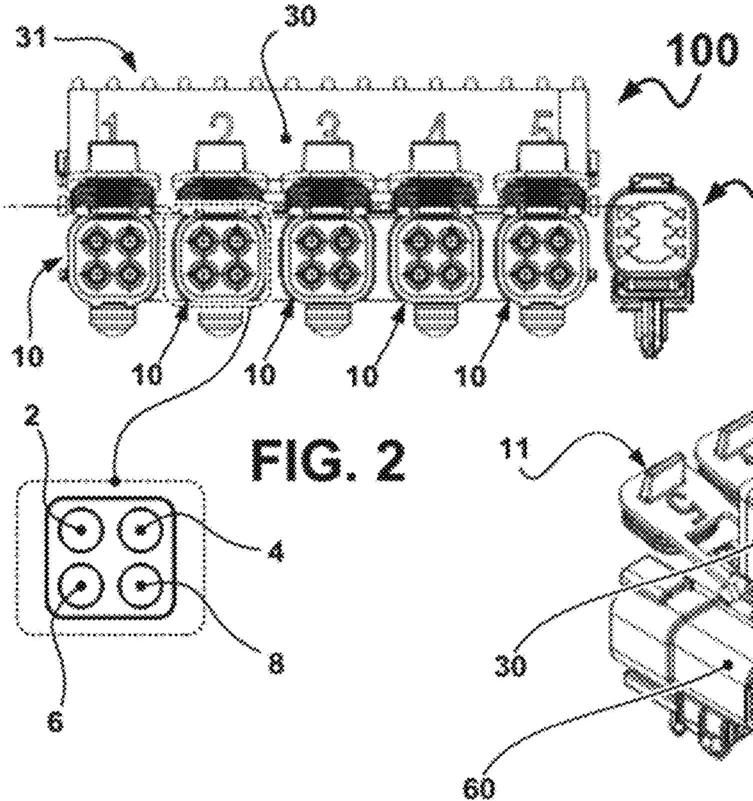
FIGS. 2 and 3 each illustrate an exemplary vehicle power bar for powering accessories from different vantage points.
Figure 3:
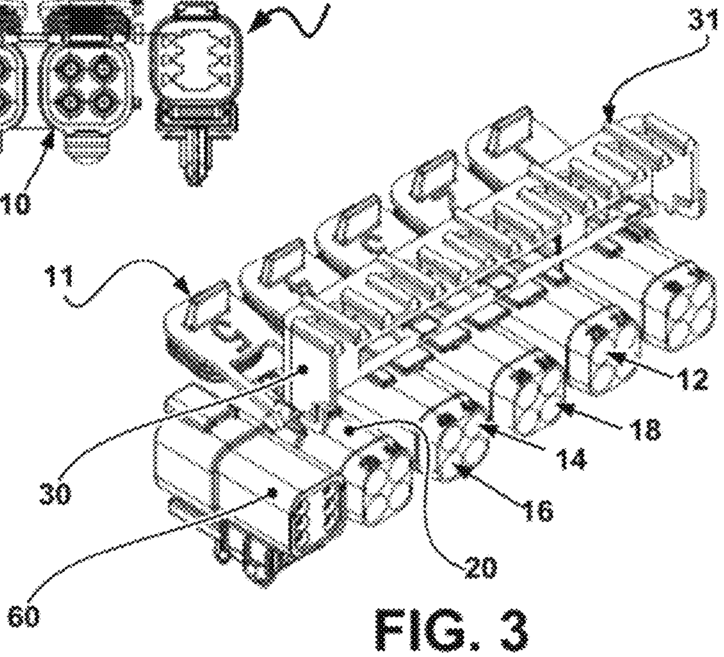

As may be further illustrated in FIGS. 2-3, an exemplary power bar 100 may comprise multiple connection ports 10 attached either mechanically or otherwise be integrated with a housing 30 comprising one or more fastening points 31 thereon. In an exemplary embodiment, the fastening points 31 may comprise mechanical interlock fasteners, such as using pins or clips, snap-fit connections, screw-in connections, magnetic attachments, and other snap-in or button-type connections. In another embodiment, an exemplary power bar 100 may comprise port 10 covers 11 to prevent influx of debris into the connection port 10 during vehicle use.

With reference to FIG. 2, an exemplary power bar 100 may have connection port 10 comprising four-six pins. As illustrated, exemplary connection port 10 may comprise a power pin 2, a ground pin 4, and pins 6 and 8 dedicated for controlling the particular accessory connected thereto. In alternative embodiments, a 6-pin accessory port 50 may be used with four (4) control pins (as illustrated by section 60), as opposed to two (2) control pins in a 4-pin accessory port 10. Every port comprises a wire center 20 from which power wire 12, ground wire 14, and control wires 16 and 18 emanate and correspond to each of the power pin 2, ground pin 4, and control pins 6, 8, respectively.

In an exemplary embodiment, each power pin 2 of a power bar 100 connection port 10 may be electrically connected to the vehicle battery via the fuse box 200. In a preferred embodiment, an exemplary power pin 2 may be configured to deliver 12V permanently. In an alternative embodiment, the power pin 2 may be directly connected to the vehicle battery and/or to the ACM 400 without connecting to the fuse box 200, which may be in the instance that the power pin 2 is one for an accessory such as a windshield cylinder as used in the Can-am Powerflip Windshield manufactured by Bombardier Recreational Products, Inc. of Valcourt, Quebec. A diagrammatic representation of the aforementioned connections may be realized with respect to FIG. 6, in which an accessory port $\mathbf{10}_1$ of an exemplary power bar 100 may have a connection 25A directly to ACM 400, which itself is powered by connection 27A via the vehicle battery 300 and/or accessory port $\mathbf{10}_2$ of an exemplary power bar 100 may be powered via connection 27B directly by vehicle battery 300.

Figure 4:
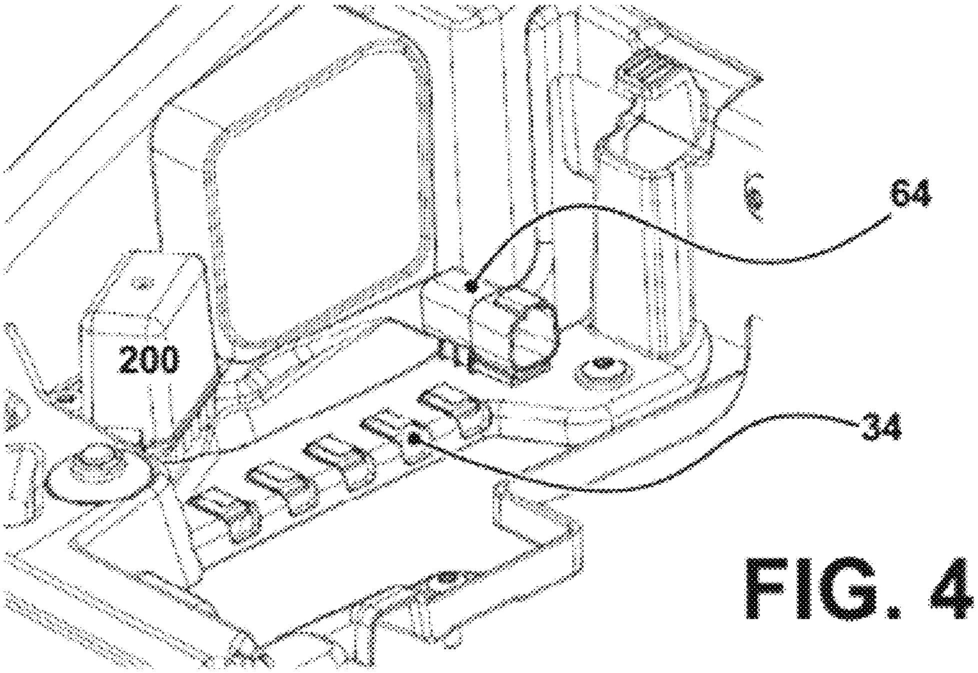
FIG. 4 illustrates an exemplary vehicle section into which an exemplary power bar for powering accessories can be installed.

Referring again to FIGS. 4 and 6, an exemplary power bar system may comprise a wired connection between the power bar 100 and ACM 400 via control wires 16/18. Accordingly, when the signal wires are connected directly to the ACM 400, they may allow the ACM 400 to control the accessory by conveying an ACM control signal, and allow the accessory to convey output signals to the ACM. In one exemplary embodiment, the signal wire 16/18 controls are configured to convey signals indicative of whether the accessory needs to be On, Off or some percentage between, using a PWM signal or a digital signal of typically 0-12V that can fluctuate continually during use. In the aspect of this embodiment where an exemplary power bar 100 comprises one signal wire 16 and/or more signal wires (e.g., signal wire 18), and preferably at least two signal wires 16/18, for each of the accessory ports 10, each accessory port 10 (and each accessory connected thereto) may be individually connected to the ACM 400 for control thereby.

In another embodiment, an initially installed power bar 100 may cause an exemplary GUI of an exemplary ACM 400 to enable a program in which the user of the ACM 400 of the vehicle can add one or more of the following to the ACM GUI screen: power bar 100, one or more ports 10 of the power bar 100, and an accessory coupled to the power bar 100 via a port 10. In another exemplary embodiment in which a number of power bar 100 may be installed on the vehicle, an exemplary ACM 400 GUI screen may provide the option of a user to select between the plurality of power bar 100 installed in and/or on the vehicle (i.e., via a "manage accessory" function) to select the appropriate power bar 100 to access. In a preferred embodiment, the management of a plurality of power bar 100 may be accomplished by selecting the power bar 100 type and/or its location vis-à-vis the user (i.e., in a roof, a trunk, a storage space, on a rear firewall).

In an alternative embodiment, an exemplary ACM 400 may be configured to automatically detect when an exemplary power bar 100 is connected or disconnected (i.e., like a plug-and-play electronic device) and/or to identify the power bar 100 via the at least one signal wire 16/18 connected to the power bar 100, e.g., by recognizing a location of the power bar 100 in the vehicle. Furthermore, an exemplary ACM 400 may be configured to communicate with an exemplary power bar 100 via the one or more signal wires 16/18 connected to the power bar 100. Additionally, an exemplary ACM 400 may be configured to automatically recognize a type of the power bar 100 (e.g., model number/type, an indication of a number of accessory ports 10 on the power bar 100).

An exemplary smart accessory ecosystem may be illustratively provided for via FIG. 6. In one embodiment, an exemplary power bar 100 may comprise a plurality of accessory power and control ports $\mathbf{10}_1$, $\mathbf{10}_2$, and $\mathbf{10}_N$ used to electrically connect accessory 1, 2, and 3, respectively. In an exemplary embodiment, accessory 1 may be connected to power bar 100 via port $\mathbf{10}_1$ but the power to port $\mathbf{10}_1$ may come from the vehicle battery 300 from power line 27A via ACM 400 through power connection 25A. Additionally, ACM 400 may be used to control accessory 1 via the control signal wires 16/18 of port $\mathbf{10}_1$ using connection 26A. In an exemplary aspect, accessories that may be contemplated for use with an exemplary ACM 400 and/or power bar 100 may be a keypad, a touch screen, a mobile computing device, a secondary power bar having at least one port and a housing with at least one surface for mechanically interconnecting to the vehicle for securement therein or thereto (the secondary power bar being affixable to the vehicle in the same or different vehicle compartments and locations as the first power bar 100 as previously described), or a tertiary power bar having at least one port and a housing with at least one surface for mechanically interconnecting to the vehicle for securement therein or thereto (the secondary power bar being affixable to the vehicle in the same or different vehicle compartments and locations as the first power bar 100 as previously described). In another exemplary embodiment involving a plurality of interconnected power bars 100, the primary power bar may be located in a front hood of the vehicle, the second power bar may be affixed to a roof of the vehicle, and the third power bar may be affixed to a rear firewall of the vehicle. Specifics of the aforementioned exemplary embodiment may be understood with reference to FIGS. 8A-B. According to this exemplary embodiment, the third power bar is configured for electrically connecting accessories configured to be located on a rear portion of the vehicle. With continued reference to FIG. 6, an exemplary power bar 100 may comprise a second accessory port, $\mathbf{10}_2$, that has its power wire 12 connected directly to vehicle battery 300 to form a power connection 27B for powering accessory 2. In contrast to accessory 1, accessory 2 may be controlled through a control connection $\mathbf{26}\mathrm{B}_2$ via signals from control wires 16/18 of port $\mathbf{10}_2$. However, in an alternative embodiment, control of accessory 2 may be selectively overridden by ACM 400 via control connection $\mathbf{26}\mathrm{B}_1$.

With continued reference to FIG. 6, an exemplary power bar 100 may comprise a third accessory port, $\mathbf{10}_N$, that has its power wire 12 connected indirectly to vehicle battery 300 via a power connection 27C to fuse box 200. In other words, accessory 3 may be powered by port $\mathbf{10}_N$ but be protected from overloading from the vehicle battery 300 by virtue of the connection 27C with fuse box 200. In this exemplary embodiment, accessory 3 may be controlled by wires 16/18 of port $\mathbf{10}_N$ via a control connection 26C. While not shown, in an exemplary embodiment, accessory 3 may have its own external control features (e.g., ACM 400 Blue tooth connection, smart phone controls/applications, sensor control) that can selectively engage/disengage the control signals from port $\mathbf{10}_N$ thereto but may not have a hardwired ACM 400 control connection.

It may be appreciated with reference to FIG. 6, that an exemplary accessory ecosystem as made possible by the illustrative power bar 100 features herein described may be capable of multiple layers of power, overload protection, and/or control from the various members of the system, e.g., the power bar 100, ACM 400, and/or the accessory control features themselves. Any permutation of the connections and interconnections discussed and/or illustrated with respect to FIG. 6 should be considered as being disclosed herein and contemplated even though not expressly stated. For example, an ACM 400 may be configured to control an accessory via the plurality of signal transmitting wires disposed within a first control port and a second control port. According to this exemplary embodiment, a first power bar is electronically connected to the ACM 400 via the first control port, a second power bar is electronically connected to the ACM 400 via the second control port, and a third power bar is electronically connected to the second control port and the ACM via the second power bar.

In another exemplary embodiment, a fuse box may be electrically connected between the power source and a first power bar, a second power bar, and a third power. Accordingly, the exemplary fuse box is configured to prevent electrical overload on at least one of the power source, and the first power bar, the second power bar, and the third power bar. In this exemplary embodiment, the fuse box comprises a first connection port for electrically connecting the first power bar and a second connection port for electrically connecting the second power bar. The third power bar may be electronically connected to the second connection port and to the fuse box via the second power bar.

In an alternative embodiment, a first fuse box may be electrically connected between the power source and the first power bar, and a second fuse box may be electrically connected between the power source and the second power bar and the third power bar. According to this alternative exemplary embodiment, the first fuse box is configured to prevent electrical overload on at least one of the power source and the first power bar, while the second fuse box is configured to prevent electrical overload on at least one of the power source and the second and third power bars. The first fuse box comprises a connection port to electrically connect with the first power bar, but the second fuse box comprises a connection port to electrically connect with the second power bar through which the third power bar is electronically connected to the second fuse box via that second power bar.

When installing or removing an accessory, an exemplary GUI of an exemplary ACM 400 may allow the user to "add" or "remove" accessories to the GUI screen via a "manage accessory" function, in which the user selects an accessory type and indicates where (i.e., on which accessory port 10 of which power bar 100) the accessory is connected. In alternative embodiments, the ACM 400 may also be configured to automatically detect when an accessory is connected to a specific accessory port 10 of an exemplary power bar 100. An exemplary ACM 400 may be configured to communicate with the accessory via the one or more signal wires 16/18 connected to the specific accessory port 10 and may be configured to automatically recognize the accessory by type, power usage, current usage, etc. An exemplary ACM 400 may also allow user customization of the accessory via the GUI of the ACM 400 (e.g., on the touch screen or via an application running on the user's remote device). Consequently, an exemplary ACM 400 may be configured to control the accessory via the one or more signal wires 16/18 connected to the specific accessory port 10.

Figure 7:
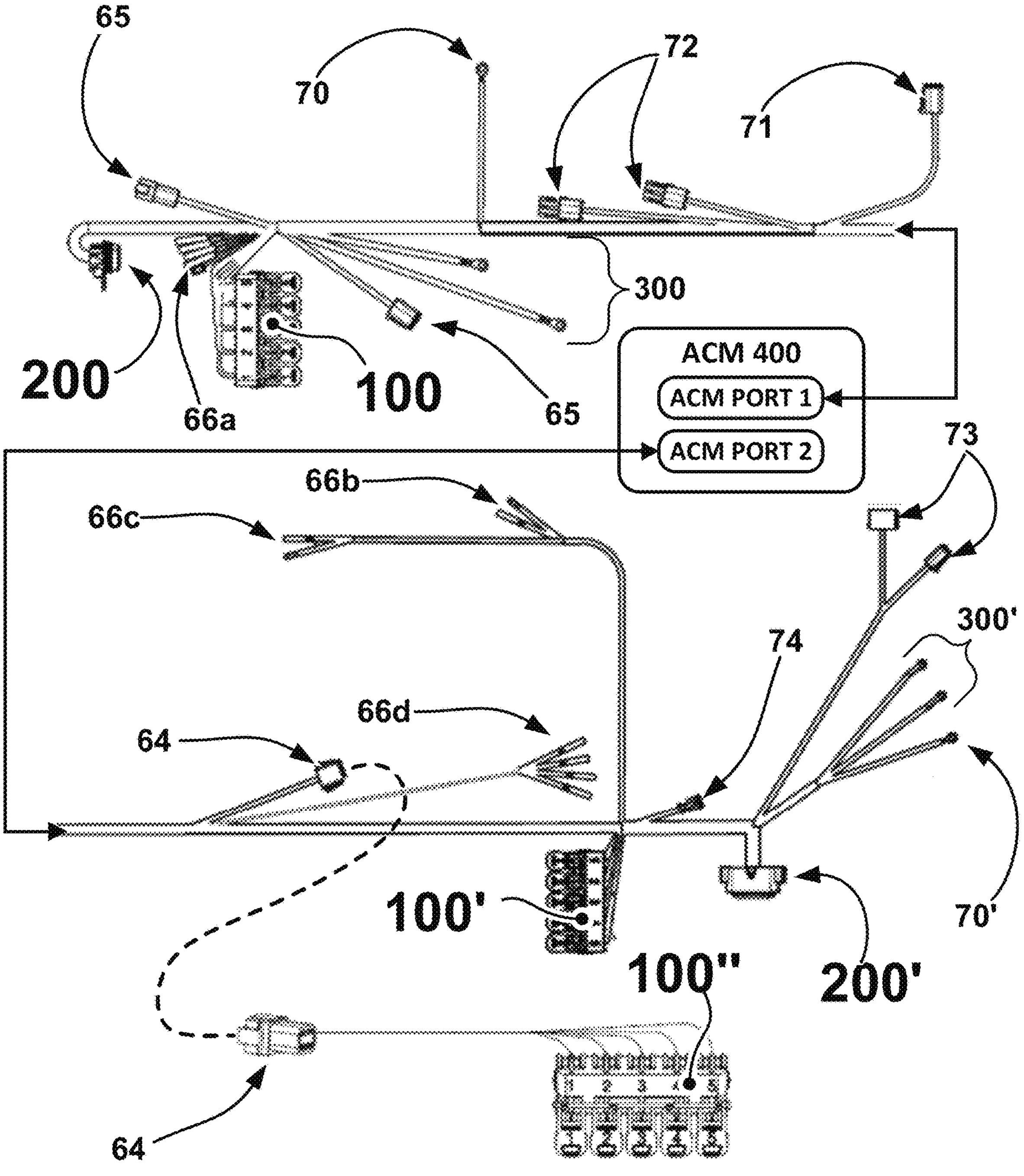
FIG. 7 illustrates another exemplary operational schematic for an exemplary smart accessory ecosystem involving a vehicular power bar.

Referring to the exemplary embodiment illustratively provided for in FIG. 7, an exemplary smart accessory ecosystem may be illustrated as a plurality of wired connections between multiple components. According to this illustrative embodiment, power bar 100, 100', and 100" may be interconnected to one another via ACM 400 via specific ports in the ACM 400 (e.g., "port 1", "port 2"). Fuse boxes 200 and 200' may be disposed at ends of the illustrative ecosystem downstream of power leads 300 and 300', respectively. According to the illustrative embodiment, the smart accessory ecosystem may further comprise ACM connectors 65 to enable ACM 400 to engage with other vehicle system computers (e.g., body control module (BCM) and engine control unit (ECU)). Further, an exemplary smart accessory ecosystem may further comprise one or more connectors 66*a*-*d*, such as, for example sealed and/or unsealed bullet type connectors, for the delivery of control signals to various media and devices connected to the remainder of the system. Accordingly, the exemplary smart accessory ecosystem would accommodate a plurality of different devices via device connections 70-74. Connections 70 and 70' may be a vehicle relay connection to the battery to provide power to the ecosystem in certain circumstances (loss of one or both fuses 200, 200' or disruptions in one of the power leads 300 or 300'. An exemplary device connection 72 may connect to heated steering wheel and/or heated seats. Exemplary device connection 71 may connect to a keyboard or other computation device. Exemplary device connection 73 may be for connecting wipers of the vehicle while connection 74 may be for the wiper washer. While the aforementioned devices have been described, connections 70-74 may encompass any number of different devices and instrumentalities used by the vehicle in operation.

Figure 8A:
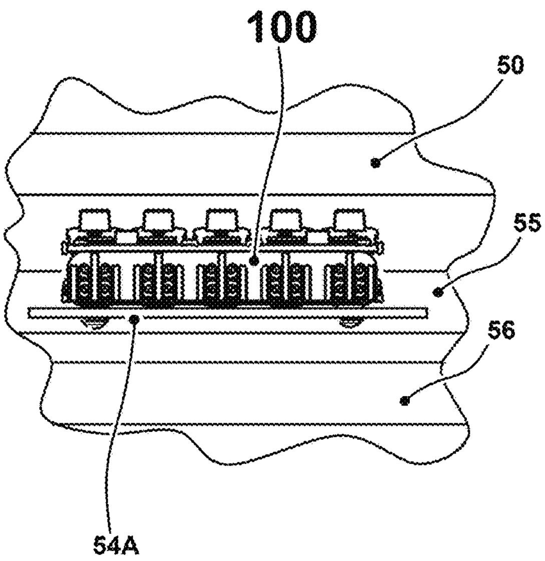
FIGS. 8A-B each illustrates an exemplary vehicular power bar installed within sections of an exemplary vehicle.
Figure 8B:
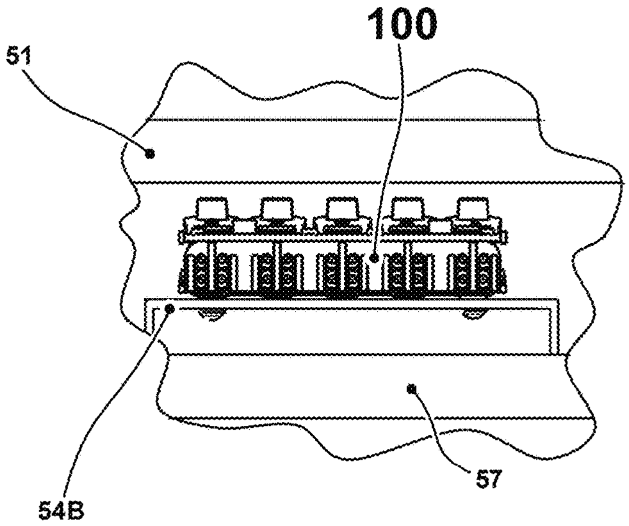

With reference to FIGS. 8A-B, an exemplary power bar 100 may be installed within the vehicle in a plurality of ways. According to the illustrative embodiment of FIG. 8A, an exemplary power bar 100 may be coupled between the roof liner 50 and the roof shell 56 via clips (or other fastening and/or adhesive connections known to those skilled in the art) located on a connector 54A that is itself disposed on and connected to a member 55 of the frame of the vehicle. According to the illustrative embodiment of FIG. 8B, an exemplary power bar 100 may be coupled between the wall liner or body panel 51 and the firewall 57 via clips (or other fastening and/or adhesive connections known to those skilled in the art) located on a connector 54B that is itself disposed on and connected to the frame of the vehicle and/or the firewall 57.

Numerous advantages may be understood due to implementation of the above embodiments, namely faster installation and more user-friendly than other harnesses, use of the same connectors throughout the ACM harness, making it cheaper and more accessible, no free/loose wires upstream from the accessory connector, centralized location for accessory connection and troubleshooting with bar 100 and fuse box 200 linked together, and possibility of stacking multiple bars 100 next to or beside one another to increase number of available connectors in a restrained area.

Many further variations and modifications may suggest themselves to those skilled in art upon making reference to above disclosure and foregoing interrelated and interchangeable illustrative embodiments, which are given by way of example only, and are not intended to limit the scope and spirit of the interrelated embodiments of the invention described herein.

The invention claimed is:

1. A powered accessory connection system for a vehicle, comprising:

a first portable power bar comprising at least one port for electrically connecting an accessory to the vehicle, the first portable power bar comprising a housing with at least one surface for mechanically interconnecting to the vehicle for securement therein or thereto;

a second portable power bar comprising at least one port and a housing with at least one surface for mechanically interconnecting to the vehicle for securement therein or thereto;

a third portable power bar comprising at least one port and a housing with at least one surface for mechanically interconnecting to the vehicle for securement therein or thereto;

a power source disposed on the vehicle and to which at least one power connection from the at least one port of each of the first, second, and third portable power bars is directly or indirectly made; and a plurality of signal transmitting wires interconnecting the accessory to the at least one port of the first portable power bar, the plurality of signal transmitting wires enabling control of the accessory via the at least one port of the first portable power bar; and an accessory control module configured to control the accessory via the plurality of signal transmitting wires, wherein the accessory control module comprises a first control port and a second control port, the first portable power bar is electronically connected to the accessory control module via the first control port, the second portable power bar is electronically connected to the accessory control module via the second control port, and the third portable power bar is electronically connected to the second control port and to the accessory control module via the second power bar.

2. A powered accessory connection system for a vehicle, comprising:

a first portable power bar comprising at least one port for electrically connecting a first accessory to the vehicle, the first portable power bar comprising a housing with at least one surface for mechanically interconnecting to the vehicle for securement therein or thereto;

a second portable power bar comprising at least one port for electrically connecting a second accessory to the vehicle, the second portable power bar comprising a housing with at least one surface for mechanically interconnecting to the vehicle for securement therein or thereto;

a power source disposed on the vehicle and to which at least one power connection from the at least one port of each of the first and second portable power bars is directly or indirectly made;

a plurality of signal transmitting wires interconnecting:

the first accessory to the at least one port of the first portable power bar for enabling control of the first accessory, and the second accessory and to the at least one port of the second portable power bar for enabling control of the second accessory; and an accessory control module electronically connected to the first and second portable power bars, the accessory control module being configured to control the first and second accessories via the plurality of signal transmitting wires.

3. The powered accessory connection system of claim 2, wherein the accessory control module comprises a control port, the first portable power bar is electronically connected to the accessory control module via the control port, and the second portable power bar is electronically connected to the accessory control module via the control port.

4. The powered accessory connection system of claim 3, further comprising a third portable power bar comprising at least one port for electrically connecting a third accessory to the vehicle, the third portable power bar comprising a housing with at least one surface for mechanically interconnecting to the vehicle for securement therein or thereto;

wherein:

the control port is a first control port;

the accessory control module further comprises a second control port; and the third power bar is electronically connected to the accessory control module via the second control port.

5. The powered accessory connection system of claim 2, wherein the accessory control module forms part of the at least one power connection.

6. The powered accessory connection system of claim 2, further comprising at least one fuse as part of the at least one power connection.

7. The powered accessory connection system of claim 2, wherein the vehicle comprises a user input device and at least one of the first portable power bar and the second portable power bar is configured to be located at a distance of less than 1 meter from the user input device.

8. The powered accessory connection system of claim 7, wherein the at least one of the first portable power bar and the second portable power bar is configured to be located in a front hood of the vehicle.

9. The powered accessory connection system of claim 2, wherein the second portable power bar is configured to be affixed to a roof of the vehicle.

10. The powered accessory connection system of claim 9, wherein the roof comprises an inner liner and an outer shell, and the second portable power bar is configured to be located between the inner liner and the outer shell.

11. The powered accessory connection system of claim 4, wherein the third portable power bar is configured to be affixed to a rear firewall of the vehicle.

12. The powered accessory connection system of claim 4, wherein the third portable power bar is configured for electrically connecting accessories configured to be located on a rear portion of the vehicle.

13. The powered accessory connection system of claim 4, further comprising a fuse box electrically between the power source and the first, second and third portable power bars, wherein: the fuse box is configured to prevent electrical overload on at least one of the power source and the first, second and third portable power bars; the fuse box comprises a first connection port and a second connection port; the first portable power bar is electronically connected to the fuse box via the first connection port; the second portable power bar is electronically connected to the fuse box via the second connection port; and the third portable power bar is electronically connected to the second connection port and to the fuse box via the second power bar.

14. The powered accessory connection system of claim 4, further comprising a first fuse box electrically between the power source and the first portable power bar, and a second fuse box electrically between the power source and the second and third portable power bars, wherein: the first fuse box is configured to prevent electrical overload on at least one of the power source and the first portable power bar; the second fuse box is configured to prevent electrical overload on at least one of the power source and the second and third portable power bars; the first fuse box comprises a connection port to electrically connect with the first portable power bar; the second portable power bar comprises a connection port to electrically connect with the second fuse box; and the third portable power bar comprises a connection port to electrically connect with the second fuse box.

15. The powered accessory connection system of claim 2, wherein the power source is directly connected to one of a fuse box and the at least one port of at least one of the first portable power bar and the second portable power bar.

* * * * *